United States Patent
Weber

[11] 3,814,933
[45] June 4, 1974

[54] OPTICAL TRANSDUCER HAVING RECTILINEAR FIBER OPTIC ARRAY INCLUDING INTERDIGITATED LIGHT SOURCE AND SENSOR ASSOCIATED FIBERS

[75] Inventor: Otto K. Weber, Van Nuys, Calif.
[73] Assignee: Sensor Technology, Inc., Chatsworth, Calif.
[22] Filed: Apr. 5, 1973
[21] Appl. No.: 348,197

[52] U.S. Cl............... 250/227, 250/569, 250/239, 350/96 B
[51] Int. Cl. .............................. G02b 5/16
[58] Field of Search......... 250/227, 219 D, 219 DC, 250/239, 569, 570, 555; 350/96 B

[56] References Cited
UNITED STATES PATENTS

| | | | |
|---|---|---|---|
| 3,384,755 | 5/1968 | Williamson et al................. | 250/227 |
| 3,430,057 | 2/1969 | Genahr .............................. | 250/227 |
| 3,474,234 | 10/1969 | Rieger et al. .................... | 250/227 X |
| 3,581,102 | 5/1971 | Nagao............................ | 250/219 D X |
| 3,566,083 | 2/1971 | McMillin....................... | 350/96 B X |
| 3,581,100 | 5/1971 | Milford........................... | 250/227 X |
| 3,622,793 | 5/1971 | Dalton et al. .................... | 250/219 D |

Primary Examiner—Walter Stolwein
Attorney, Agent, or Firm—Flam & Flam

[57] ABSTRACT

A fiber optic transducer includes at least one read aperture at which optical fibers conducting light from a source and fibers transmitting reflected light to a sensor terminate in rectilinear array. The optical fibers all are of rectangular cross-section and are arranged in the array so that each row of reflected light transmitting fibers is interdigitated between rows of light source conducting fibers. The other ends of the light source fibers from all of the read apertures terminate in a single source aperture illuminated by a light emitting diode or other light source. The reflected light transmitting fibers from each read aperture terminate at respective separate sensor apertures. The transducer is used to read optically coded indicia on a tag, label or other article which is moved past the transducer in close proximity to the read apertures in a direction parallel to the interdigital rows of fibers.

11 Claims, 11 Drawing Figures

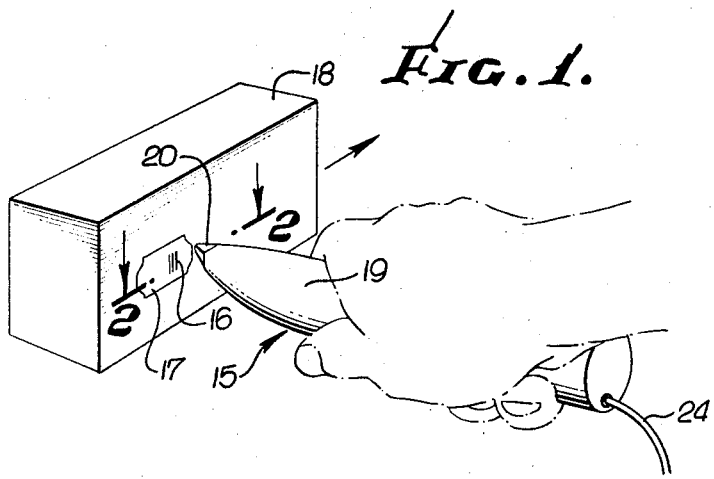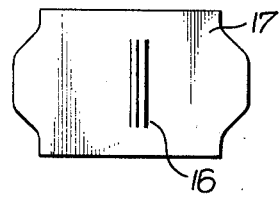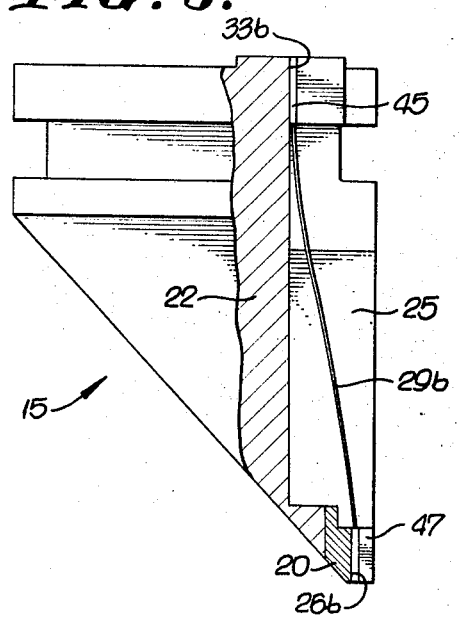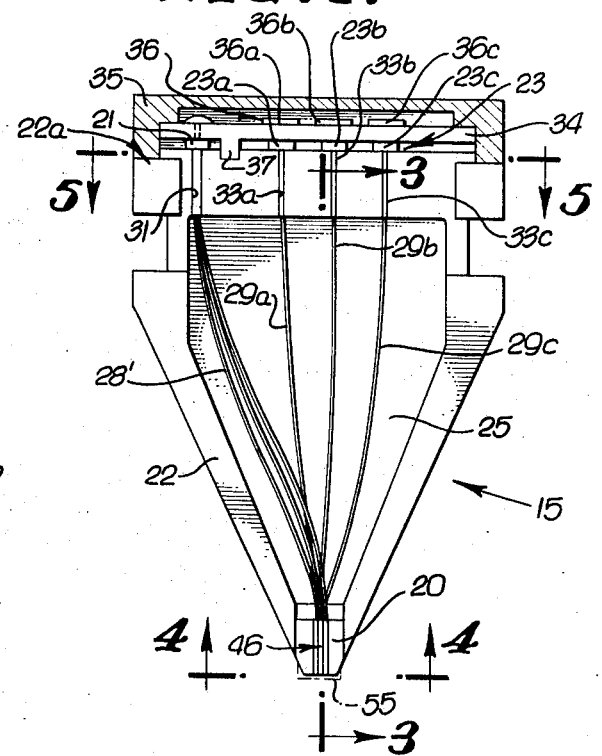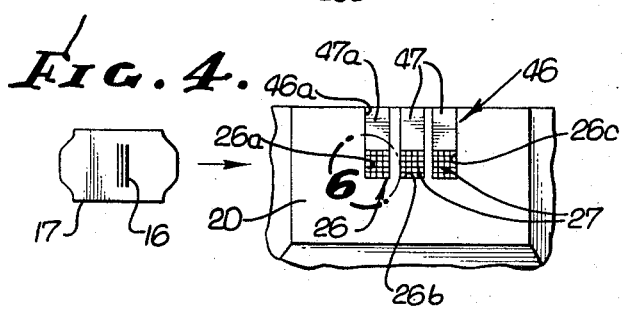

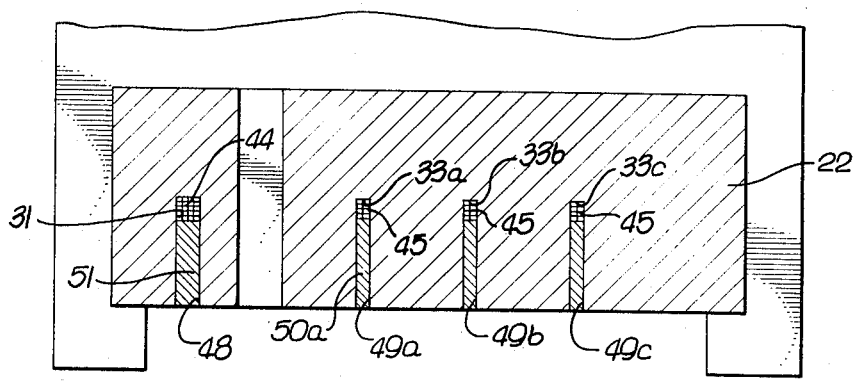
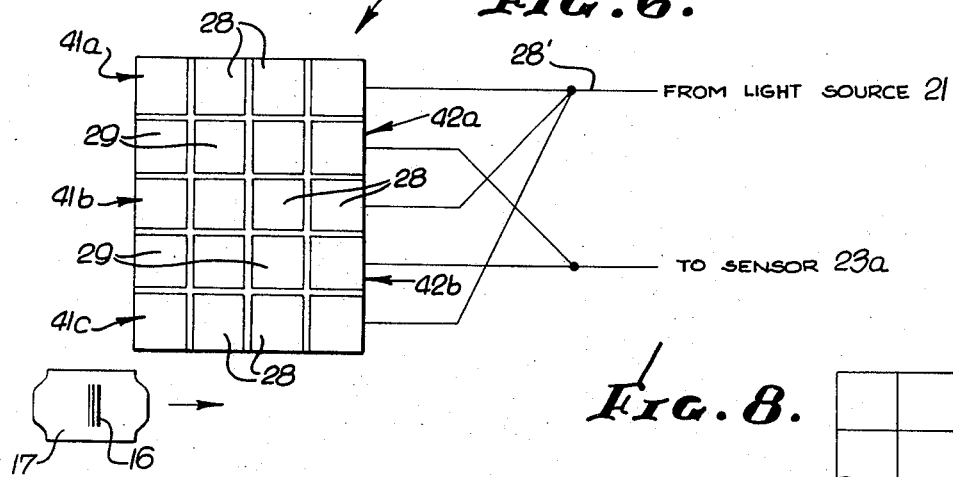
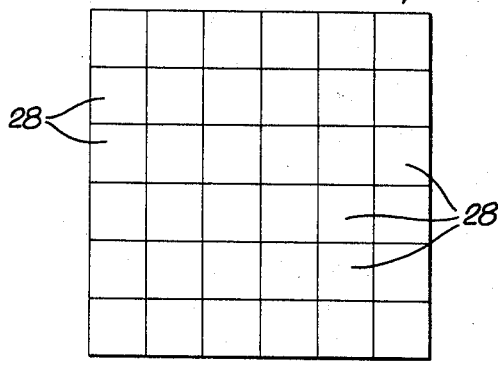
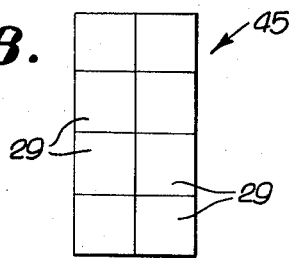
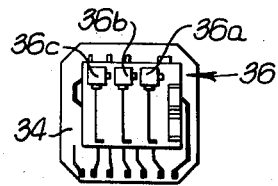
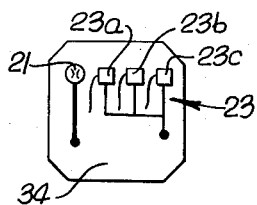

OPTICAL TRANSDUCER HAVING RECTILINEAR FIBER OPTIC ARRAY INCLUDING INTERDIGITATED LIGHT SOURCE AND SENSOR ASSOCIATED FIBERS

BACKGROUND OF THE INVENTION

1. Field of the Invention

The present invention relates to an optical transducer for reading coded indicia on a tag, label or other article, and more particularly to such a transducer having a rectilinear fiber optic array including interdigitated light source and sensor associated optical fibers.

2. Description of the Prior Art

Point of sale inventory control is gaining widespread acceptance in retail marketing. As an aid to such accounting, each article of merchandise is marked with a label or tag coded with price, stock number, or other inventory information. When the article is purchased, information from the tag is provided to the inventory control data processing system. Constantly updated reports of stock on hand, rate of sales of each item, etc. are obtained. These reports facilitate merchandise re-order when the stock of a certain item drops below some level, establish which items are selling rapidly and which are moving more slowly, and indicate style, color or other customer preferences as a guide for future buying.

In a known system, the inventory control information is entered as a punched hole code on a small tag attached to each article. When the article is purchased, a portion of the tag is torn off by the sales person and placed in a bin. At the end of each day, or at some other time interval, the tags are collected and taken to a central location. There the tags are read by a mechanical or electro-optical tag reader which prepares the tag information for computer input.

This system, while functional, requires considerable physical handling of the tags. The tags are small, so that the chance of loss is high. This is particularly so since the tags are separately handled by the cashier, in transit to the data processing center, and during feed-in to the mechanical reader. Such handling also results in mutilated tags which often cannot be read properly by machine. Errors result. There is a time delay of hours or days between the time of sale and the time when the information is available to the inventory control computer.

These shortcomings are eliminated by using optically coded tags which are read by a transducer at the point of sale for direct computer input. The cashier need only direct a hand held optical reader over the label, or pass the tag beneath a stationary read head, to accomplish data input. Rapid, accurate inventory control information is obtained. Typically, the code consists of a series of marks printed in blank ink on a white label or tag (see FIG. 1A). As the tag is passed by the read head, light from a source is reflected back from the tag; the difference in reflected light level indicates whether a mark is present.

The read head or transducer used to scan such optically coded tags has certain requirements. Preferably, the read head should provide a light source directly at the label, of sufficient intensity so as to produce a reflected light level which unambiguously indicates the presence or absence of a coded mark. The use of a light source external to the read head is undesirable, since some physical separation between the tag and the read head then would be required to permit the light to impinge on the label. Such separation results in the need for an optical lens or focusing system, adding to the cost, complexity and size of the device. The problem is particularly acute for systems wherein the tag is of small size and the coded indicia smaller yet.

The use of a self-contained light source, transmitted by fiber optics, is preferred. However, efficient light transfer through the transducer to the label is a problem aggrevated when the area to be illuminated is small. In prior art transducers, relatively high power light sources were required to compensate for inefficiencies in transmission. The use of circular cross-section optical fibers did not optimize the amount of light transmitted to a transducer aperture of given small size.

Another requirement is that the read head should operate in the presence of ambient light, without being affected by it. Thus the transducer should provide an unambiguous output even when used in a supermarket or retail store having a very high ambient light level.

Light reflected from the coded tag or label advantageously is conducted to a phototransistor or other sensor by fiber optics. However, if the optical fibers are not uniformly distributed over the sensing head window, the sensor output pulses become distorted. This may result in erroneous interpretation of the coded indicia. In the past, individually adjusted pulse shapers had to be used with each sensor output to obtain accurate data.

Other problems relate to wear on the transducer as a result of constant rubbing by the tags or labels being read, and the undesirable accumulation of dirt or dust on the transducer window. A further problem is the difficulty of assembly of prior art optical transducers.

The objective of the present invention is to provide a transducer for reading optically coded tags or labels, which overcomes all of the foregoing shortcomings. The inventive transducer includes a self-contained light source efficiently transmitted only to the area of the coded tag being read. The fiber optic configuration is optimized, to minimize the light source power requirements, and to provide uniform illumination and uniform pickup of reflected light. The transducer provides an unambiguous output, without the need for pulse shapers, even with high background light levels. The transducer has good wear capability, and is easy to assemble.

SUMMARY OF THE INVENTION

These and other objects are achieved by providing a fiber optic transducer for reading optically coded indicia on a tag, label or other article which is moved past the transducer in close proximity to a set of read apertures. A rectilinear array of optical fibers terminates within each such aperture. Each array includes rows of fibers transmitting light from a source interspersed with rows of fibers for conducting light reflected from the article back to a sensor. Preferably, each row of reflected light transmitting fibers is situated between two rows of source associated fibers. This array configuration, utilizing individual fibers of generally rectangular cross section, optimizes light transmission through the small aperture, and provides undistorted detection of coded indicia.

The other end of the source transmitting fibers from all of the read apertures terminate together at a single aperture, adjacent which is mounted a low power infrared light emitting diode or other light source. The reflected light conducting fibers from each read aperture terminate at respective, separate sensor apertures. Phototransistors and associated integrated circuit amplifiers are mounted in the read head adjacent the sensor apertures. A process for simplified assembly of the inventive transducer also is disclosed.

BRIEF DESCRIPTION OF THE DRAWINGS

A detailed description of the invention will be made with reference to the accompanying drawings, wherein like numerals designate corresponding parts in the several figures. These drawings, unless otherwise indicated, are to scale.

FIG. 1 is a pictorial view illustrating use of the inventive optical transducer for reading a coded tag or label.

FIG. 1A shows a typical optically coded label of the type which may be read using the optical transducer of FIG. 1.

FIG. 2 is a transverse view of the interior of the optical transducer of FIG. 1, as seen along the line 2—2 thereof.

FIG. 3 is a sectional view of the transducer as seen along the line 3—3 of FIG. 2.

FIG. 4 is an end view of the transducer, as seen along the line 4—4 of FIG. 2, showing the read apertures.

FIG. 5 is a sectional view of the transducer, as seen along the line 5—5 of FIG. 2, showing the source and sensor apertures.

FIG. 6 is greatly enlarged, somewhat diagrammatic view of the rectilinear fiber optic array employed in each transducer read aperture of FIG. 4.

FIGS. 7 and 8 respectively are greatly enlarged, somewhat diagrammatic views of the optical fiber arrays at the source and sensor apertures respectively.

FIGS. 9A and 9B are pictorial top and bottom views of a hybrid circuit including a light source, sensors and sensor amplifiers useful with the inventive optical transducer.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Referring to FIG. 1, the inventive optical transducer 15 advantageously is used to read the coded indicia 16 on a label 17 attached to an article of merchandise 18. In the embodiment shown, the transducer 15 is mounted to a handle 19 which readily permits a cashier or other user to move the transducer reading tip 20 past the indicia 16 in close proximity to the surface of the label 17. A light source 21 in the transducer housing 22 illuminates the label 17. Reflected light is detected by photo-sensors 23 to provide electrical signals via a cable 24 for input to appropriate data processing equipment.

The transducer housing 22 has an interior chamber 25 which is filled with opaque encapsulating material after assembly of the fiber optic components. The reading tip 20 is made of hard material such as berillium or stainless steel and includes a set of read apertures 26 (FIG. 4). A plurality of optical fibers terminate in a rectilinear array 27 in each of the read apertures 26. As indicated in FIG. 6, each array 27 includes optical fibers 28 which conduct light from the source 21 to the read aperture 26, and other optical fibers 29 which transmit reflected light back to an associated sensor 23.

As shown in FIG. 2, the bundles 28' of optical fibers 28 from all of the read apertures 26 terminate in a single, common source aperture 31 located at the end 22a of the housing 22 opposite the tip 20. The single light source 21, advantageously an infrared light emitting diode, is mounted adjacent the source aperture 31 close to the end of the fiber bundle 28'.

The bundles 29a–29c of optical fibers 29 from the respective read apertures 26a–26c terminate in corresponding sensor apertures 33a–33c in the housing end 22a. An associated phototransistor or other sensor 23a–23c is mounted adjacent each sensor aperture 33a–33c. In this way, each sensor 23 receives only the light reflected by the label 17 back to a respective aperture 26.

Advantageously the light source 21 and the sensors 23 all are mounted on a common hybrid circuit substrate 34 (FIGS. 2, 9A and 9B). The substrate 34 is held in place against the housing end 22a by a member 35. The substrate 34 also includes individual microelectronic amplifiers 36a–36c associated with the respective sensors 23a–23c. The amplifier outputs, indicative of the indicia 16 on the label 17 being read, are provided via the cable 24. An appropriate partition 37 prevents light from the source 21 from passing directly to the sensors 23.

An important feature of the present invention is the arrangement of the optical fibers 28, 29 in the array 27 (FIG. 6). Each of the individual source fibers 28 and sensor fibers 29 preferably is of rectangular cross-section. In the preferred embodiment illustrated, each fiber has a generally square cross-section, the dimension of each side being between 0.4 mils and 3.5 mils. The source fibers 28 terminate in three parallel rows 41a–41c. The sensor fibers 29 terminate in two rows 42a, 42b which are situated between the rows 41a–41c of source fibers 28. Thus the array 27 may be characterized as having interdigitated rows of source and sensor fibers. Preferably the rows 41a–41c, 42a, 42b are aligned parallel to the direction of relative motion of the label 17 past the transducer 15. In this way, the leading edge 16a of the indicia 16 simultaneously will be exposed to light provided via the source fibers 28, and simultaneously will reflect light back to the sensor fibers 29. This results in optimum resolution of the sensed indicia 16. The resultant output pulses from the sensors 23 and amplifiers 36 normally require no additional shaping.

To minimize interference from ambient light, it is preferable that the outer rows of the array 27 be source fiber 28 terminations. Thus in FIG. 6, the outer rows 41a, 41c both transmit light from the source 21. The sensor fiber rows 42a, 42b are not exposed on their edges to ambient light, but primarily receive reflected light supplied to the label 17 via the source fibers 28.

Further in this regard, excellent performance is achieved using infrared light. To this end, the light source 21 preferably comprises a diode which emits light in the infrared region. The sensors 23 may have response curves optimized in the infrared region. This also minimizes interference from ambient visible light.

The use of rectangular cross-section fibers optimizes the amount of source and reflected light transmitted through an aperture of fixed size. This is especially important in a transducer of small size, such as the one illustrated wherein each read aperture 26 may be as small as about 1.6 mils by 2.0 mils. The use of rectangular cross-section fibers also enables a relatively small light source 21 to illuminate all of the fiber bundles 28'. Thus in the source fiber array 44 (FIG. 7), all of the source fibers 28 are closely packed for uniform illumination by a typical light emitting diode. Similarly, the typical sensor fiber bundle 29a from the read aperture 26a terminates in a closely packed, compact array 45 (FIG. 8) which optimizes light conduction to the associated sensor 23a.

Assembly of the transducer 15 is simplified by providing the tip 20 with a set of aperture-defining slots 46 into which the fibers 28, 29 are assembled row by row. A plug 47 then is inserted in each slot 46 to maintain the fiber optic array 27 in place. The plug 47 defines the fourth side of each aperture 26. As shown in FIG. 4, the slots 46 preferably extend in a direction perpendicular to the rows 41a–41c of the array 27. Similarly, aperture-defining slots 48 and 49a–49c (FIG. 5) are formed in the housing end 22a to facilitate assembly of the source and sensor arrays 44, 45.

The optical fibers 28, 29 are installed one row at a time. Initially, four fibers 28 which will form the row 41a are dipped in epoxy or other adhesive, and wiped into a flat plane. Capillary action pulls the four fibers tightly together. The fibers may be placed on a Mylar or Teflon sheet while the adhesive sets. One end of the four bound fibers then is inserted into the slot 46a; the other end is inserted into the source-aperture defining slot 48 (FIG. 5). Next four more fibers similarly are dipped in adhesive, wiped flat, and placed within the slot 46a to form the matrix row 42a. The other end of these fibers 29 is inserted into the slot 49a (FIG. 5) which defines the sensor aperture 33a. This process is repeated until all of the optical fiber rows 41a–41c, 42a, 42b have been inserted into the slot 46a. The metal plug 47a then is inserted to complete assembly of the read aperture 26a. At this time a plug 50a is inserted within the slot 49a to complete assembly of and define the sensor aperture 33a. A like procedure is used to assemble the arrays 27 in the read apertures 26b and 26c. When all of the source fibers 28 have been placed into the aperture-defining slot 48, a plug 51 is inserted to complete assembly of the source aperture 31.

Although not shown, the square cross-section fibers 28, 29 may be replaced with fibers of rectangular cross-section. Thus, the typical row 41a may comprise two rectangular fibers having a thickness of between 0.4 and 3.5 mils and a width dimension of twice this value. Alternatively, a single rectangular fiber having thickness in the same dimension range, and a width equal to four times its thickness, may be employed.

To protect the read aperture arrays 27 from wear due to constant rubbing of labels 17 moving past the tip 20, the apertures 26 optionally may be covered with a window 55. Preferably the window 55 is of hard, wear resistant material which is transparent in the spectral range of the light source 21. For example, the window 55 may comprise sapphire, which has a hardness of about 9 moh and is transparent to infrared light. Similarly, quartz (4.5 moh) or strontium titanate (6 moh) may be used. The window 55 may be attached to the tip 20 by adhesive.

Dust accumulation on the read apertures 26 may be minimized by preventing the buildup of static charge on the tip 20 which tends to attract dust particles. This can be accomplished by mounting a small amount of polonium or other retroactive source (not shown) in or near the tip 20. The local radiation ionizes the air near the tip 20 so that any static charge will leak off. As a result, there will be no field to attract and hold particles. Dust will not accumulate.

Intending to claim all novel, useful and unobvious features shown or described, the inventor make the following claims:

1. A fiber optic transducer for reading optically coded indicia on a label or other article, comprising:
   a housing having at least one read aperture at one end thereof, said coded indicia being read during relative linear motion of said article past said read apertures in close proximity to said one end,
   a rectilinear array of optical fibers terminating within each read aperture, each of said fibers being of substantially rectangular cross-section, said array including an odd number of rows of source fibers for transmitting light toward said read aperture interdigitated with an even number of rows of sensor fibers for transmitting light reflected from said article back to a sensor, the rows of source and sensor fibers in each read aperture all being aligned parallel to the relative direction of motion of said article, said rows of source and sensor fibers alternating in a direction lateral to the relative direction of motion of said article, the outermost rows in said array being the source fiber rows, each sensor fiber row being situated between rows of source fibers, and elsewhere on said housing,
   a light source aperture at which the other ends of all of the source fibers from all of said read apertures terminate in a rectilinear array, and
   at least one sensor aperture at each of which terminate in rectilinear array the other ends of the sensor fibers from a respective read aperture.

2. A fiber optic transducer according to claim 1 wherein said housing also contains a circuit board including a photosensor aligned with each of said sensor apertures and a light source aligned with said source aperture.

3. A fiber optic transducer according to claim 2 wherein said source comprises an infrared light emitting diode, wherein said sensors are responsive to infrared light, and wherein an integrated circuit amplifier for each photosensor also is mounted on said board.

4. A fiber optic transducer according to claim 1 wherein each source and sensor fiber has a square cross-section, the dimension of each side being between 0.4 mils and 3.5 mils.

5. An optical transducer for reading coded indicia printed on a label, tag or other article, comprising:

a housing tapering toward a tip, said reading being accomplished during rectilinear travel of said coded indicia past said tip, said tip including a plurality of read apertures, a rectilinear array of optical fibers of rectangular cross-section terminating in each aperture, said array including alternate rows of source fibers for transmitting light from a source interdigitated with rows of sensor fibers for transmitting light reflected from said article back to a sensor, said alternate rows all being aligned parallel to the relative direction of travel past said tip of the coded indicia being read, the outermost of said alternate rows being rows of source fibers, said housing having an interior chamber and having one wall spaced from said tip, said one wall including a source aperture in which terminate the other ends of the source fibers from all of said read apertures, said one wall also having a like plurality of sensor apertures, all of the sensor fibers from each read aperture terminating in a respective sensor aperture, and a light source and a like plurality of photosensors mounted to said housing on the opposite side of said one wall in respective, close spaced alignment with said source aperture and said sensor apertures.

6. An optical transducer according to claim 5 wherein each optical fiber has a side dimension between 0.4 mils and 3.5 mils.

7. An optical transducer according to claim 5 wherein said read apertures are covered with a window of material having a hardness greater than about 4 moh and which is transparent to light in the spectral range emitted by said light source.

8. A transducer according to claim 5 wherein said tip includes a plurality of read aperture defining slots extending to one edge of said tip, each slot facilitating assembly of the optical fibers forming said array for that read aperture, and a plug inserted in each of said read aperture defining slot to retain the array in place and to define the fourth side of the respective read aperture.

9. An optical transducer according to claim 8 wherein said housing one wall includes a like plurality of sensor aperture defining slots and a single source aperture defining slot, and wherein said light source and said plurality of photosensors are mounted on a common substrate also supporting a separate microelectronic amplifier for each photosensor.

10. A process for assembling the transducer of claim 9 comprising the steps of;
  a. assembling a group of optical fibers into a flat row,
  b. inserting one end of said flat row into the slot defining one of said read apertures,
  c. inserting the other end of said flat row into said source aperture defining slot,
  d. repeating said steps (a) and (b) for another group of fibers, and inserting the other end of said other group of fibers into one sensor defining slot associated with said one read aperture,
  e. repeating steps (a) through (d) until all rows of said one read aperture have been assembled, followed by insertion of plugs into said one read aperture defining slot and into said one sensor aperture defining slot, and
  f. repeating steps (a) through (e) until all read aperture arrays have been assembled, followed by insertion of a plug into said source aperture defining slot to retain in place all of the source fibers terminating therein.

11. A process according to claim 10 followed by the step of filling said interior chamber with opaque encapsulating material.

* * * * *